US010824664B2

(12) United States Patent
Zu et al.

(10) Patent No.: US 10,824,664 B2
(45) Date of Patent: Nov. 3, 2020

(54) METHOD AND APPARATUS FOR PROVIDING TEXT PUSH INFORMATION RESPONSIVE TO A VOICE QUERY REQUEST

(71) Applicant: Baidu Online Network Technology (Beijing) Co., Ltd., Beijing (CN)

(72) Inventors: Hualong Zu, Beijing (CN); Haiguang Yuan, Beijing (CN); Ran Xu, Beijing (CN); Chen Chen, Beijing (CN); Lei Shi, Beijing (CN); Xin Li, Beijing (CN); Liou Chen, Beijing (CN)

(73) Assignee: BAIDU ONLINE NETWORK TECHNOLOGY (BEIJING) CO, LTD., Beijing (CN)

( * ) Notice: Subject to any disclaimer, the term of this patent is extended or adjusted under 35 U.S.C. 154(b) by 98 days.

(21) Appl. No.: 15/855,440

(22) Filed: Dec. 27, 2017

(65) Prior Publication Data

US 2019/0147049 A1    May 16, 2019

(30) Foreign Application Priority Data

Nov. 16, 2017    (CN) .......................... 2017 1 1139649

(51) Int. Cl.
| | |
|---|---|
| G06F 16/432 | (2019.01) |
| G10L 15/22 | (2006.01) |
| G10L 13/033 | (2013.01) |
| G10L 15/26 | (2006.01) |
| G06F 16/9535 | (2019.01) |
| G06F 16/34 | (2019.01) |

(Continued)

(52) U.S. Cl.
CPC ........ *G06F 16/433* (2019.01); *G06F 16/9535* (2019.01); *G06Q 10/10* (2013.01); *G10L 13/033* (2013.01); *G10L 15/22* (2013.01); *G10L 15/26* (2013.01); *G06F 16/345* (2019.01); *G10L 25/54* (2013.01); *G10L 2015/223* (2013.01)

(58) Field of Classification Search
CPC ... G06F 16/345; G06F 16/433; G10L 13/033; G10L 15/22; G10L 15/26; G10L 2015/233; G10L 25/54
USPC .............................. 704/270.1, 275; 707/732
See application file for complete search history.

(56) References Cited

U.S. PATENT DOCUMENTS

| | | | |
|---|---|---|---|
| 5,943,669 A | * | 8/1999 | Numata ................ G06F 16/353 |
| 6,334,126 B1 | * | 12/2001 | Nagatomo .......... G06F 16/9577 |

(Continued)

FOREIGN PATENT DOCUMENTS

| | | |
|---|---|---|
| CN | 105491126 A | 4/2016 |
| CN | 105653738 A | 6/2016 |

*Primary Examiner* — James S Wozniak
(74) *Attorney, Agent, or Firm* — Nixon Peabody LLP (57) ABSTRACT

Embodiments of the present disclosure disclose a method and apparatus for processing information. A specific implementation of the method includes: parsing a received voice query request sent by a user to obtain text query information corresponding to the voice query request; obtaining text push information obtained by searching using the text query information; processing the text push information to obtain to-be-pushed information corresponding to the text push information; and playing the to-be-pushed information. The implementation can play information when the user is not convenient to browse the information, so that the user can obtain the information in time.

11 Claims, 3 Drawing Sheets

(51) Int. Cl.
*G10L 25/54* (2013.01)
*G06Q 10/10* (2012.01)

(56) References Cited

U.S. PATENT DOCUMENTS

| | | | | |
|---|---|---|---|---|
| 6,748,361 | B1* | 6/2004 | Comerford | G10L 15/28 704/275 |
| 7,024,363 | B1* | 4/2006 | Comerford | G10L 15/22 704/270 |
| 7,136,909 | B2* | 11/2006 | Balasuriya | G06F 3/038 709/220 |
| 7,219,136 | B1* | 5/2007 | Danner | G06Q 20/16 379/67.1 |
| 8,566,102 | B1* | 10/2013 | Bangalore | G10L 15/22 704/270.1 |
| 10,127,323 | B1* | 11/2018 | Boni | G06F 16/9535 |
| 2001/0047262 | A1* | 11/2001 | Kurganov | H04M 3/4938 704/270.1 |
| 2002/0194004 | A1* | 12/2002 | Glinski | G10L 15/197 704/270.1 |
| 2003/0069880 | A1* | 4/2003 | Harrison | G06F 16/3334 |
| 2003/0125953 | A1* | 7/2003 | Sharma | H04M 3/4938 704/270 |
| 2003/0200858 | A1* | 10/2003 | Xie | G10H 1/26 84/609 |
| 2003/0212559 | A1* | 11/2003 | Xie | G10L 13/04 704/260 |
| 2005/0149329 | A1* | 7/2005 | Elshafei | G10L 21/04 704/266 |
| 2006/0136375 | A1* | 6/2006 | Cox | G10L 15/22 |
| 2006/0143559 | A1* | 6/2006 | Spielberg | G06F 3/165 715/201 |
| 2006/0173682 | A1* | 8/2006 | Manabe | G10L 15/26 704/246 |
| 2010/0185648 | A1* | 7/2010 | Chauhan | G06F 3/167 707/769 |
| 2011/0043652 | A1* | 2/2011 | King | G06F 17/2211 348/222.1 |
| 2011/0153324 | A1* | 6/2011 | Ballinger | G10L 15/30 704/235 |
| 2011/0320950 | A1* | 12/2011 | Rajput | G10L 21/043 715/728 |
| 2012/0047131 | A1* | 2/2012 | Billawala | G06F 16/338 707/723 |
| 2012/0059816 | A1* | 3/2012 | Narayanan | G06F 16/9535 707/710 |
| 2012/0166473 | A1* | 6/2012 | Ahmadi | G06F 16/3322 707/769 |
| 2012/0254161 | A1* | 10/2012 | Zhang | G06F 16/9535 707/723 |
| 2013/0006629 | A1* | 1/2013 | Honda | G10L 15/187 704/236 |
| 2013/0006641 | A1* | 1/2013 | Brown | G06F 16/3329 704/270.1 |
| 2013/0318091 | A1* | 11/2013 | Bhatia | G06F 16/33 707/741 |
| 2013/0326353 | A1* | 12/2013 | Singhal | G06F 3/167 715/728 |
| 2013/0332166 | A1 | 12/2013 | Higashi et al. | |
| 2014/0067837 | A1* | 3/2014 | Sadhuka | G06F 16/9535 707/758 |
| 2014/0074482 | A1* | 3/2014 | Ohno | G10L 13/04 704/275 |
| 2014/0149403 | A1* | 5/2014 | Miller | H04L 43/16 707/728 |
| 2015/0243294 | A1* | 8/2015 | Kitatani | G09B 5/04 704/270 |
| 2016/0179752 | A1* | 6/2016 | Clark | G06F 16/9566 704/270.1 |
| 2016/0246476 | A1* | 8/2016 | Harris | G06F 16/24578 |
| 2016/0246791 | A1* | 8/2016 | Long | G06F 16/9535 |
| 2016/0284341 | A1* | 9/2016 | Hirakawa | G10L 13/027 |
| 2017/0032689 | A1* | 2/2017 | Beason | G09B 7/00 |
| 2017/0238026 | A1* | 8/2017 | Agrawal | H04N 21/2387 725/14 |
| 2017/0255702 | A1 | 9/2017 | Liu et al. | |
| 2017/0300535 | A1* | 10/2017 | Papineni | G06F 16/332 |
| 2018/0181677 | A1* | 6/2018 | Wei | G06F 16/345 |
| 2018/0210883 | A1* | 7/2018 | Ang | G06F 17/277 |
| 2018/0322103 | A1* | 11/2018 | Yeo | G06F 17/2235 |
| 2018/0365321 | A1* | 12/2018 | Ke | G06N 3/0445 |
| 2019/0034405 | A1* | 1/2019 | Ivan | G06F 17/276 |
| 2019/0056785 | A1* | 2/2019 | Suk | G06F 3/017 |
| 2019/0149625 | A1* | 5/2019 | Garon | H04L 67/22 |
| 2020/0012650 | A1* | 1/2020 | Fan | G06F 16/24573 |
| 2020/0050671 | A1* | 2/2020 | Feng | G06F 40/30 |

* cited by examiner

METHOD AND APPARATUS FOR PROVIDING TEXT PUSH INFORMATION RESPONSIVE TO A VOICE QUERY REQUEST

CROSS-REFERENCE TO RELATED APPLICATION

This application is related to and claims the priority from Chinese Application No. 201711139649.1, filed on Nov. 16, 2017, entitled "Method and Apparatus for Processing Information," having Baidu Online Network Technology (Beijing) Co., Ltd. as the applicant, the entire disclosure of which is incorporated herein by reference.

TECHNICAL FIELD

Embodiments of the present disclosure relate to the field of computer technology, specifically to the field of Internet technology, and more specifically to a method and apparatus for processing information.

BACKGROUND

Artificial Intelligence, abbreviated as AI, is a new technological science for research and development of a theory, method, technology and application system used to simulate, extend and expand human intelligence. Artificial intelligence is a branch of computer science, and attempts to understand the essence of intelligence, and to produce a new intelligent machine reacting in a way similar to human intelligence. The research in this field includes robots, language recognition, image recognition, natural language processing and expert systems etc.

With the rapid development of artificial intelligence, all kinds of applications based on artificial intelligence have come out in waves, and great convenience is brought to daily life at the same time. For example, an artificial intelligence conversation assistant combines three functions of speech recognition, natural language processing and machine learning, so that a user can communicate with the artificial intelligence conversation assistant in a one-to-one mode using voices, texts or pictures, and the artificial intelligence conversation assistant can clearly understand various needs of the user in dialogue, and then provide the user with various high-quality services on the basis of extensively indexing services and information in the real world. An existing artificial intelligence conversation secretary processes data, such as a voice query request, by analyzing and in other ways after receiving the voice query request sent by the user, and displays a processing result on a display screen of a terminal device.

SUMMARY

Embodiments of the present disclosure provide a method and apparatus for processing information.

In a first aspect, the embodiments of the present disclosure provides the method for processing information, and the method includes: parsing a received voice query request sent by a user to obtain text query information corresponding to the voice query request; obtaining text push information obtained by searching using the text query information; processing the text push information to obtain to-be-pushed information corresponding to the text push information; and playing the to-be-pushed information.

In some embodiments, the processing the text push information to obtain the to-be-pushed information corresponding to the text push information includes: determining whether a word number of the text push information exceeds a preset word number threshold; extracting information, associated with the text query information and having a word number not exceeding the preset word number threshold, from the text push information as first information in response to determining the word number of the text push information exceeding the preset word number threshold; and generating the to-be-pushed information on the basis of the first information.

In some embodiments, the processing the text push information to obtain the to-be-pushed information corresponding to the text push information includes: assigning the text push information as the first information in response to determining the word number of the text push information not exceeding the preset word number threshold.

In some embodiments, the generating the to-be-pushed information on the basis of the first information includes: obtaining a website name of a website, the text push information belonging to the website; and combining the website name with the first information to generate the to-be-pushed information.

In some embodiments, the generating the to-be-pushed information on the basis of the first information includes: obtaining a website name of a website, the text push information belonging to the website; and combining the text query information, the website name and the first information to generate the to-be-pushed information.

In some embodiments, the generating the to-be-pushed information on the basis of the first information includes: obtaining a website name of a website, the text push information belonging to the web site, and subject information of the text push information; and combining the subject information, the website name and the first information to generate the to-be-pushed information.

In some embodiments, the method further includes displaying the to-be-pushed information, and the generating the to-be-pushed information on the basis of the first information includes: obtaining picture push information obtained by searching using the text query information; and combining the picture push information with the first information to generate the to-be-pushed information.

In some embodiments, the playing the to-be-pushed information includes: receiving a voice playing speed control instruction sent by the user; obtaining a voice playing speed corresponding to the voice playing speed control instruction; and playing the to-be-pushed information at the voice playing speed.

In some embodiments, the method further includes: receiving a detailed information acquisition request sent by the user; and playing the text push information.

In a second aspect, the embodiments of the present disclosure provides the apparatus for processing information, and the apparatus includes: a parsing unit, configured for parsing a received voice query request sent by a user to obtain text query information corresponding to the voice query request; an obtaining unit, configured for obtaining text push information obtained by searching using the text query information; a processing unit, configured for processing the text push information to obtain to-be-pushed information corresponding to the text push information; and a first playing unit, configured for playing the to-be-pushed information.

In some embodiments, the processing unit includes: a determining subunit, configured for determining whether a word number of the text push information exceeds a preset word number threshold; an extracting subunit, configured for extracting information, associated with the text query information and having a word number not exceeding the preset word number threshold, from the text push information as first information in response to determining the word number of the text push information exceeding the preset word number threshold; and a generating subunit, configured for generating the to-be-pushed information on the basis of the first information.

In some embodiments, the processing unit further includes an assigning subunit, configured for assigning the text push information as the first information in response to determining the word number of the text push information not exceeding the preset word number threshold.

In some embodiments, the generating subunit includes: a first obtaining module, configured for obtaining a web site name of a web site, the text push information belonging to the website; and a first combining module, configured for combining the website name and the first information to generate the to-be-pushed information.

In some embodiments, the generating subunit includes: a second obtaining module, configured for obtaining a web site name of a web site, the text push information belonging to the website; and a second combining module, configured for combining the text query information, the website name and the first information to generate the to-be-pushed information.

In some embodiments, the generating subunit includes: a third obtaining module, configured for obtaining a web site name of a web site, the text push information belonging to the website, and subject information of the text push information; and a third combining module, configured for combining the subject information, the website name and the first information to generate the to-be-pushed information.

In some embodiments, the apparatus further includes a display unit configured for displaying the to-be-pushed information, and the generating subunit includes: a fourth obtaining module, configured for obtaining picture push information obtained by searching using the text query information; and a fourth combining module, configured for combining the picture push information with the first information to generate the to-be-pushed information.

In some embodiments, the first playing unit includes: a receiving subunit, configured for receiving a voice playing speed control instruction sent by the user; an obtaining subunit, configured for obtaining a voice playing speed corresponding to the voice playing speed control instruction; and a playing subunit, configured for playing the to-be-pushed information at the voice playing speed.

In some embodiments, the apparatus further includes: a receiving unit, configured for receiving a detailed information acquisition request sent by the user; and a second playing unit, configured for playing the text push information.

In a third aspect, the embodiments of the present disclosure provide a terminal device including: one or more processors, and a storage device for storing one or more programs, wherein when the one or more programs are executed by the one or more processors, the one or more processors implement the method described by any implementation mode in the first aspect.

In a fourth aspect, the embodiments of the present disclosure provide a computer readable storage medium on which computer programs are stored, and when the computer programs are executed by the processors, the method as described in any implementation mode in the first aspect is implemented.

According to the method and apparatus for processing information, provided by the embodiments of the present disclosure, a voice query request sent by a user is parsed to obtain text query information corresponding to the voice query request; text push information is then obtained by searching using the text query information, and the text push information is processed to obtain to-be-pushed information corresponding to the text push information; and finally, the to-be-pushed information is played. As a result, information can be played when the user is not convenient to browse the information, and then the user can obtain the information in time.

BRIEF DESCRIPTION OF THE DRAWINGS

After reading detailed descriptions of non-limiting embodiments with reference to the following accompanying drawings, other features, objectives and advantages of the present invention will be more apparent.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
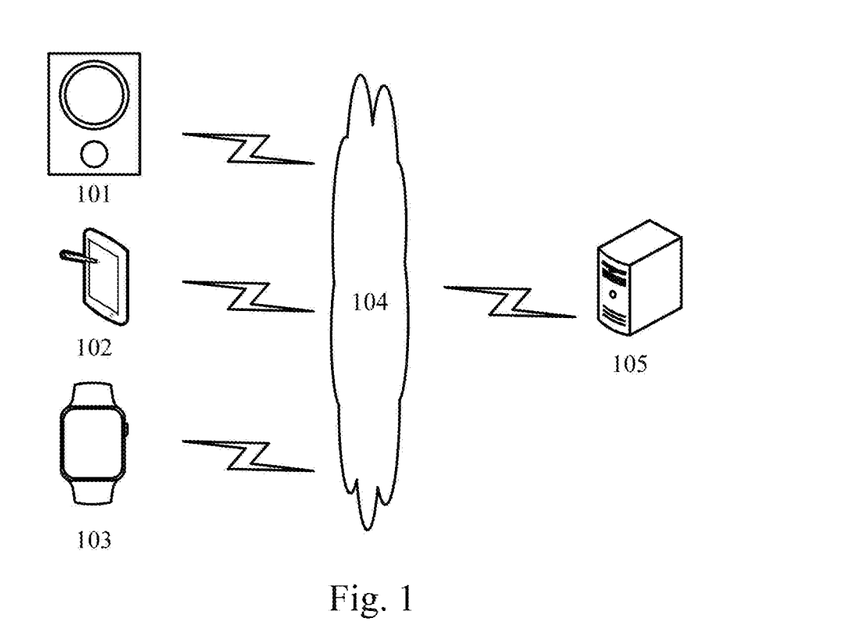
FIG. 1 is an illustrative system architecture diagram to which the embodiments of the present disclosure can be applied.

FIG. 1 shows an exemplary architecture of a system 100 which may be used by a method or apparatus for processing information according to the embodiments of the present disclosure.

As shown in FIG. 1, the system architecture 100 may include terminal devices 101, 102 and 103, a network 104 and a server 105. The network 104 serves as a medium providing a communication link between the terminal devices 101, 102 and 103 and the server 105. The network 104 may include various types of connections, such as wired or wireless transmission links, or optical fibers.

The user may use the terminal devices 101, 102 and 103 to interact with the server 105 through the network 104, in order to transmit or receive messages, etc. Various communication client applications, such as a dialogical artificial intelligence secretary may be installed on the terminal devices 101, 102 and 103.

The terminal devices 101, 102 and 103 may be various electronic devices capable of interacting with the server, including but not limited to, smart phones, tablet computers, e-book readers, MP3 (Moving Picture Experts Group Audio Layer III) players, MP4 (Moving Picture Experts Group Audio Layer IV) players, laptop computers, desktop computers, wearable devices and intelligent speakers.

The server 105 may be server providing various services, for example, a backend server of searching engines. The backend server of searching engines may perform processing such as analyzing on data such as the text query information received from the terminal devices 101, 102 and 103, and return a processing result (for example, text push information) to the terminal devices.

It should be noted that the method for processing information according to the embodiments of the present application is generally executed by the server 105, and accordingly, an apparatus for processing information is generally installed on the server 105.

It should be appreciated that the numbers of the terminal devices, the networks and the servers in FIG. 1 are merely illustrative. Any number of terminal devices, networks and servers may be provided based on the actual requirements.

Figure 2:
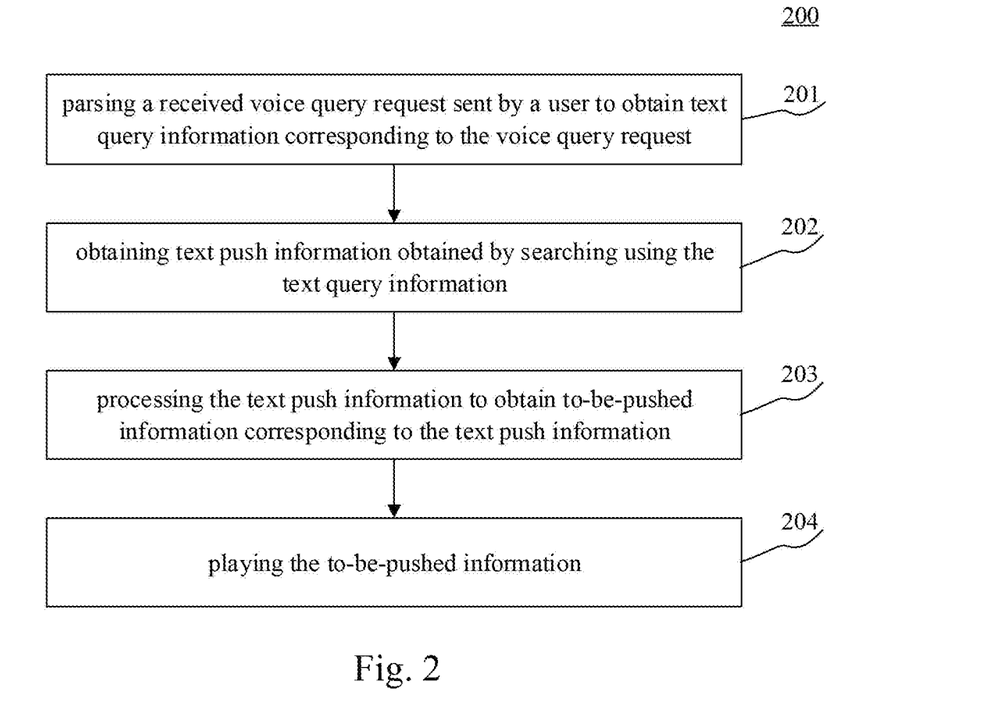
FIG. 2 is a flow diagram of an embodiment of the method for processing information according to the present disclosure.

Continue to refer to FIG. 2, it shows a process 200 of an embodiment of the method for processing information according to the present disclosure. The method for processing information includes the following steps.

In Step 201, a received voice query request sent by a user is parsed to obtain text query information corresponding to the voice query request.

In the present embodiment, a terminal device (for example, the terminal device 101, 102 or 103) on which the method for processing information is operated may receive a voice query request sent by a user, and parse the received voice query request so as to obtain text query information corresponding to the voice query request. The voice query request may include voice query information.

In the present embodiment, the terminal device generally has a voice assistant function. Specifically, the terminal device may be a device provided with a microphone and other voice input modules, for example, a smart phone, a tablet computer, a computer, a wearable device and a smart sound box. The user may say voice query information to the terminal device, and when the microphone and other voice input modules arranged on the terminal device collect the voice query information said by the user, it can be considered that the terminal device has received a voice query request sent by the user.

In the present embodiment, the terminal device may perform speech recognition on the voice query information in the voice query request so as to obtain text query information corresponding to the voice query request. Here, the terminal device may perform speech recognition on the voice query information by using a speech recognition technology (Automatic Speech Recognition, ASR) to convert a vocabulary content in the voice query information into a vocabulary content in written language, i.e., the text query information. The speech recognition technology is also known as automatic speech recognition, and is a technology for converting vocabulary contents in human speeches into words.

In Step 202, text push information obtained by searching using the text query information is obtained.

In the present embodiment, the terminal device may send the text query information to a background server (for example, the server 105 shown in FIG. 1) of a search engine on the basis of the text query information obtained in Step 201, and the background server of the search engine may search information on the Internet using the text query information so as to obtain the text push information related to the text query information, and send the obtained text push information to the terminal device. The text push information may have identical characteristic attributes with the text query information. As an example, when the text query information is "elephant", the text push information may be information related to the "elephant", for example, encyclopedic knowledge of the "elephant".

It should be noted that the method for searching the text push information using the text query information is an existing knowledge technology, and will no longer be described here.

In Step 203, the text push information is processed to obtain to-be-pushed information corresponding to the text push information.

In the present embodiment, the terminal device may process the text push information on the basis of the text push information obtained in Step 202, so as to obtain the to-be-pushed information corresponding to the text push information. The terminal device may regard the text push information as the to-be-pushed information directly, extract a part of information from the text push information as the to-be-pushed information, or add a part of information into the text push information to generate the to-be-pushed information.

In Step 204, the to-be-pushed information is played.

In the present embodiment, the terminal device may play the to-be-pushed information on the basis of the to-be-pushed information obtained in Step 203. In the present embodiment, the terminal device may be a device provided with an audio player and other voice output modules, for example, a smart phone, a tablet computer, a computer, a wearable device and a smart sound box. The terminal device may convert the to-be-pushed information into corresponding voice information using a text-to-speech conversion technology, and play the converted voice information, wherein the text-to-speech conversion technology may be a technology for explaining text information, and this technology is a sound production technology based on a sound synthesis technology, and may convert text information in a computer into continuous natural voice information.

In some optional implementations of the present embodiment, the terminal device may also display the to-be-pushed information. Here, the terminal device may be a device provided with a display screen, for example, a smart phone, a tablet computer and a computer. Under the condition that the terminal device is provided with both a display screen and an audio player, the terminal device may determine whether to use the display screen configured thereon to display the to-be-pushed information or to use the audio player configured thereon to play the to-be-pushed information based on settings of a user.

In some optional implementations of the present embodiment, the voice playing speed may be controlled. Generally, a default voice playing speed may be set in the terminal device, for example, 4.7 words per second, and when the voice playing speed is not controlled, the audio player plays the to-be-pushed information at a speed of 4.7 words per second; and when the voice playing speed is controlled, the following steps may be specified.

First, a voice playing speed control instruction sent by a user is received.

Here, the user may input the voice playing speed control instruction through the microphone and other voice input modules configured on the terminal device. The voice playing speed control instruction may include information related to a voice playing speed, which not only may be specific information of the voice playing speed, but also may be information of controlling increase or decrease of the voice playing speed. For example, the voice playing speed control instruction may be "play at a speed of 4 words per second," "a little faster," "speak a little faster," "speed up" etc., and may also be "a little slower," "speak a little slower," "slow down" etc.

Then, a voice playing speed corresponding to the voice playing speed control instruction is obtained.

For example, when the voice playing speed control instruction is "play at a speed of 4 words per second," the voice playing speed is 4 words per second; when the voice playing speed control instruction is "a little faster," "speak a little faster," "speed up" etc., the voice playing speed is a certain value (e.g., 1) more based on a current voice playing speed (e.g., 4.7 words per second), i.e., 5.7 words per second; and when the voice playing speed control instruction is "a little slower," "speak a little slower," "slow down" etc., the voice playing speed is a certain value (e.g., 1) less based on the current voice playing speed (e.g., 4.7 words per second), i.e., 3.7 words per second.

Finally, the to-be-pushed information is played at the voice playing speed.

According to the method for processing information, provided by the embodiments of the present disclosure, a voice query request sent by a user is parsed to obtain text query information corresponding to the voice query request; text push information is then obtained by searching using the text query information, and the text push information is processed to obtain to-be-pushed information corresponding to the text push information; and finally, the to-be-pushed information is played. As a result, information can be played when the user is not convenient to browse the information, and then the user can obtain the information in time.

Figure 3:
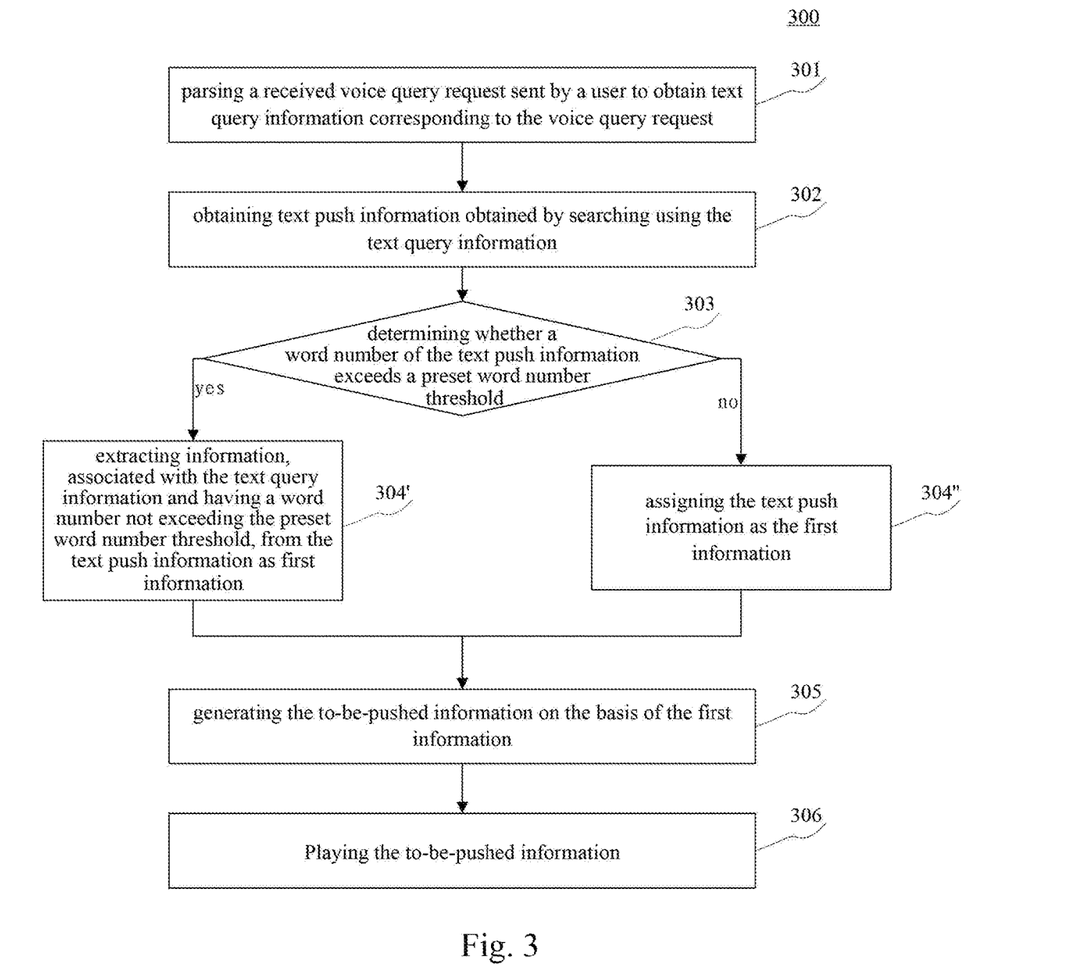
FIG. 3 is a flow diagram of another embodiment of the method for processing information according to the present disclosure.

Further referring to FIG. 3, it shows a process 300 of another embodiment of the method for processing information according to the present disclosure. The process 300 of the method for processing information includes the following steps.

In Step 301, a received voice query request sent by a user is parsed to obtain text query information corresponding to the voice query request.

In the present embodiment, a terminal device (for example, the terminal device 101, 102 or 103) on which the method for processing information is operated may receive a voice query request sent by a user, and parse the received voice query request so as to obtain text query information corresponding to the voice query request. The voice query request may include voice query information.

Step 302, text push information obtained by searching using the text query information is obtained.

In the present embodiment, the terminal device may send the text query information to a background server (for example, the server 105 shown in FIG. 1) of a search engine on the basis of the text query information obtained in Step 301, and the background server of the search engine may search information on the Internet using the text query information so as to obtain the text push information related to the text query information, and send the obtained text push information to the terminal device.

In Step 303, whether a word number of the text push information exceeds a preset word number threshold is determined.

In the present embodiment, the terminal device may obtain the word number of the text push information on the basis of the text push information obtained in Step 302, and compare the word number of the text push information with the preset word number threshold (e.g., 200), and Step 304' is executed if the word number of the text push information exceeds the preset word number threshold; and Step 304" is executed if the word number of the text push information does not exceed the preset word number threshold.

In Step 304', information, associated with the text query information and having a word number not exceeding the preset word number threshold, is extracted from the text push information as first information.

In the present embodiment, under the condition that the word number of the text push information exceeds the preset word number threshold, the terminal device may extract information, associated with the text query information and having a word number not exceeding the preset word number threshold, from the text push information as first information. Thus, the length of the generated to-be-pushed information based on the first information is avoided from being too long. As an example, if the text push information includes a plurality of paragraphs. For each paragraph, the terminal device may first determine a correlation degree between the content of the paragraph and the text query information, then sort the paragraphs according to an order of correlation degrees, and finally start to select a plurality of paragraphs from a side with a big correlation degree, with the sum of word numbers of the selected paragraphs being smaller than the preset word number threshold. Here, the terminal device may determine a correlation degree between the content of a paragraph and the text query information according to a number of keywords in the text query information contained in the content of the paragraph; and generally, the bigger the number of the keywords in the text query information contained in the paragraph is, the greater the correlation degree between the content of the paragraph and the text query information is.

In Step 304", the text push information is assigned as the first information.

In the present embodiment, under the condition that the word number of the text push information does not exceed the preset word number threshold, the terminal device regards the text push information as the first information.

In Step 305, the to-be-pushed information is generated based on the first information.

In the present embodiment, based on the first information obtained in Step 304' or 304", the terminal device may generate the to-be-pushed information. The to-be-pushed information may be the first information, or information obtained by adding a part of information based on the first information.

In some optional implementations of the present embodiment, the electronic device may first obtain a website name of a website, the text push information belonging to the website, and then combine the website name with the first information to generate the to-be-pushed information. As an example, if the text push information is encyclopedic knowledge of "elephant," the website name of the website to which the text push information belongs is "XX encyclopedia," and the first information is a paragraph of "The generally-known elephant is the largest mammal on land at present, belongs to proboscidea, and has only one family, two genera and three species, namely, the elephant family, the African elephants and the Asian elephants" in the encyclopedic knowledge of "elephant," the to-be-pushed information may be "From XX encyclopedia: the generally-known elephant is the largest mammal on land at present, belongs to proboscidea, and has only one family, two genera and three species, namely, the elephant family, the African elephants and the Asian elephants." By adding the website name of the website to which the text push information belongs into the to-be-pushed information, the user may determine the reliability of the first information according to the website name.

In some optional implementations of the present embodiment, the terminal device may first obtain the website name of the website to which the text push information belongs, and then combine the text query information, the website name and the first information to generate the to-be-pushed information. As an example, if the text query information is "elephant," the text push information is encyclopedic knowledge of "elephant," the website name of the website to which the text push information belongs is "XX encyclopedia," and the first information is a paragraph of "The generally-known elephant is the largest mammal on land at present, belongs to proboscidea, and has only one family, two genera and three species, namely, the elephant family, the African elephants and the Asian elephants" in the encyclopedic knowledge of "elephant," the to-be-pushed information may be "Elephant, from XX encyclopedia: the generally-known elephant is the largest mammal on land at present, belongs to proboscidea, and has only one family, two genera and three species, namely, the elephant family, the African elephants and the Asian elephants." By adding the text query information to the to-be-pushed information, the user may determine whether the terminal device identifies the voice query information correctly according to the text query information, so as to determine whether the first information is information needed by the user.

In some optional implementations of the present embodiment, the terminal device may first obtain the website name of the website to which the text push information belongs and subject information of the text push information, and then combine the subject information, the website name and the first information to generate the to-be-pushed information. As an example, if the text query information is "elephant," the text push information is encyclopedic knowledge of "elephant," the subject information of the text push information is "elephant," the website name of the website to which the text push information belongs is "XX encyclopedia," and the first information is a paragraph of "An elephant is an animal of mammalia, proboscidea and elephant family, is the largest mammal on land, likes to live in jungles and grasslands, is a staunch vegetarian, and has a long life, up to eighty years," the to-be-pushed information may be "Elephant, from XX encyclopedia: An elephant an animal of mammalia, proboscidea and elephant family, is the largest mammal on land, likes to live in jungles and grasslands, is a staunch vegetarian, and has a long life, up to eighty years." By adding the subject information of the text push information to the to-be-pushed information, the user may determine the similarity between the subject information of the text push information and the voice query information, and determine whether the first information is the information needed by the user according to the similarity.

In some optional implementations of the present embodiment, the terminal device may also display the to-be-pushed information, and the electronic device may first obtain picture push information obtained by searching using the text query information, and then combine the picture push information with the first information to generate the to-be-pushed information. Here, the terminal device may send the text query information to a background server of a search engine, and the background server of the search engine may search information on the Internet using the text query information so as to obtain picture push information related to the text query information, and send the obtained picture push information to the terminal device. As an example, if the text push information is encyclopedic knowledge of "elephant," the picture push information is a picture of "elephant," and the first information is a paragraph in the encyclopedic knowledge of "elephant," the display screen may display the picture of "elephant" and the first information at the same time. By adding the picture push information to the to-be-pushed information, the user can clearly determine whether the first information is the information needed by the user according to the picture push information on the one hand, and the content of the to-be-pushed information is also enriched on the other hand.

In Step 306, the to-be-pushed information is played.

In the present embodiment, the terminal device may play the to-be-pushed information based on the to-be-pushed information obtained in Step 305.

In some optional implementations of the present embodiment, after playing the to-be-pushed information, the terminal device may also play the text push information. Specifically, after playing the to-be-pushed information, the terminal device may send a prompt message on whether to obtain detailed information to the user, and may play the text push information after receiving a detailed information acquisition request sent by the user. For example, after playing the to-be-pushed information, the terminal device may also play the voice information of "If you want to know more contents, please say yes to me," and may play the text push information after the user says "yes" to the terminal device.

In some optional implementations of the present embodiment, after displaying the to-be-pushed information, the terminal device may also display the text push information. Specifically, after displaying the to-be-pushed information, the terminal device may send a prompt message on whether to obtain detailed information to the user, and may display the text push information after receiving a detailed information acquisition request sent by the user. For example, after displaying the to-be-pushed information, the terminal device may also display text information of "If you want to know more contents, please click here," and may display the text push information after the user clicks the text information.

By comparing with the corresponding embodiment in FIG. 2, it can be seen from FIG. 3 that the process 300 of the method for processing information in the present embodiment highlights the step of processing the text push information to obtain the to-be-pushed information. Thus, the solution described by the present embodiment may actively extract an appropriate word number and information meeting user needs for the user, and presents the same to the user, thereby saving the time for the user to obtain the needed information.

Figure 4:
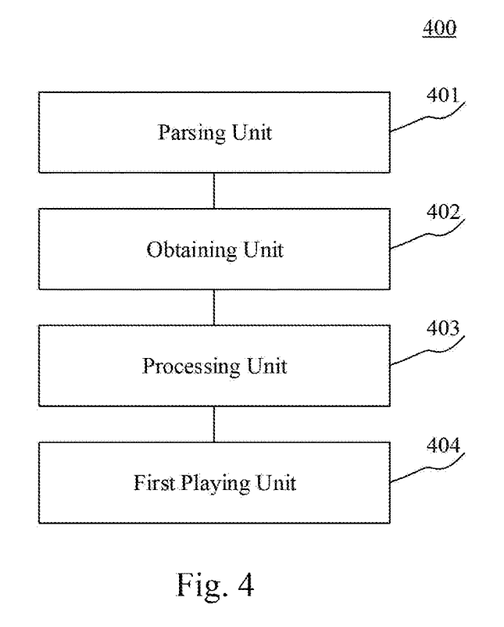
FIG. 4 is a structure diagram of an embodiment of the apparatus for processing information according to the present disclosure.

Further referring to FIG. 4, as an implementation of the methods shown in the above FIGS., the present disclosure provides an embodiment of an apparatus for processing information, the embodiment of the apparatus corresponds to the embodiment of the method shown in FIG. 2, and the apparatus can be specifically applied to various types of electronic devices.

As shown in FIG. 4, the apparatus 400 for processing information in the present embodiment includes: a parsing unit 401, an obtaining unit 402, a processing unit 403 and a first playing unit 404. The parsing unit 401 is configured for parsing a received voice query request sent by a user to obtain text query information corresponding to the voice query request; the obtaining unit 402 is configured for obtaining text push information obtained by searching using the text query information; the processing unit 403 is configured for processing the text push information to obtain to-be-pushed information corresponding to the text push information; and the first playing unit 404 is configured for playing the to-be-pushed information.

In the present embodiment, specific treatments and technical effects brought by the same of the parsing unit 401, the obtaining unit 402, the processing unit 403 and the first playing unit 404 in the apparatus 400 for processing information may be referred to related descriptions of Step 201, Step 202, Step 203 and Step 204 in the corresponding embodiment in FIG. 2 respectively, and will not be repeated here.

In some optional implementations of the present embodiment, the processing unit 403 may include: a determining subunit (not shown in the drawings), configured for determining whether a word number of the text push information exceeds a preset word number threshold; an extracting subunit (not shown in the drawings), configured for extracting information, associated with the text query information and having a word number not exceeding the preset word number threshold, from the text push information as first information in response to determining the word number of the text push information exceeding the preset word number threshold; and a generating subunit (not shown in the drawings), configured for generating the to-be-pushed information on the basis of the first information.

In some optional implementations of the present embodiment, the processing unit 403 may further include an assigning subunit (not shown in the drawings), configured for assigning the text push information as the first information in response to determining the word number of the text push information not exceeding the preset word number threshold.

In some optional implementations of the present embodiment, the generating subunit may include: a first obtaining module (not shown in the drawings), configured for obtaining a website name of a website, the text push information belonging to the website; and a first combining module (not shown in the drawings), configured for combining the website name and the first information to generate the to-be-pushed information.

In some optional implementations of the present embodiment, the generating subunit may include: a second obtaining module (not shown in the drawings), configured for obtaining a website name of a website, the text push information belonging to the website; and a second combining module (not shown in the drawings), configured for combining the text query information, the website name and the first information to generate the to-be-pushed information.

In some optional implementations of the present embodiment, the generating subunit may include: a third obtaining module (not shown in the drawings), configured for obtaining a website name of a website, the text push information belonging to the website, and subject information of the text push information; and a third combining module (not shown in the drawings), configured for combining the subject information, the website name and the first information to generate the to-be-pushed information.

In some optional implementations of the present embodiment, the apparatus 400 for processing information may further include a display unit (not shown in the drawings) configured for displaying the to-be-pushed information, and the generating subunit may include: a fourth obtaining module (not shown in the drawings), configured for obtaining picture push information obtained by searching using the text query information; and a fourth combining module (not shown in the drawings), configured for combining the picture push information and the first information to generate the to-be-pushed information.

In some optional implementations of the present embodiment, the first playing unit 404 may include: a receiving subunit (not shown in the drawings), configured for receiving a voice playing speed control instruction sent by the user; an obtaining subunit (not shown in the drawings), configured for obtaining a voice playing speed corresponding to the voice playing speed control instruction; and a playing subunit (not shown in the drawings), configured for playing the to-be-pushed information at the voice playing speed.

In some optional implementations of the present embodiment, the apparatus 400 for processing information may further include: a receiving unit (not shown in the drawings), configured for receiving a detailed information acquisition request sent by the user; and a second playing unit (not shown in the drawings), configured for playing the text push information.

Figure 5:
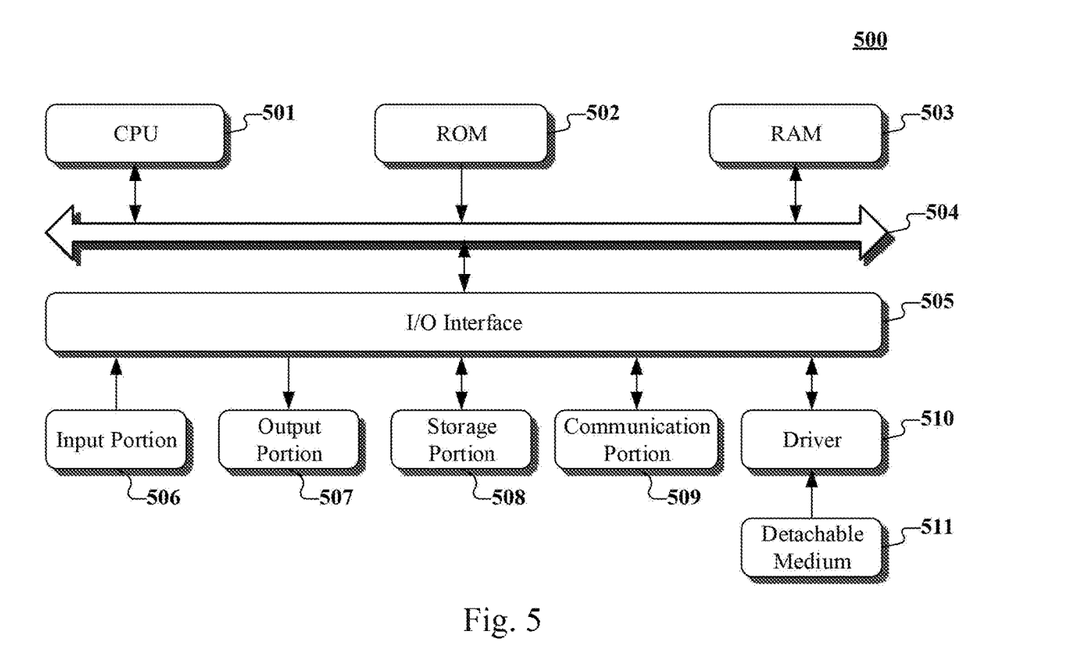
FIG. 5 is a structure diagram of a computer system of a terminal device suitable for implementing the embodiments of the present disclosure.

Referring to FIG. 5, a schematic structural diagram of a computer system 500 adapted to implement a server of the embodiments of the present application is shown. The terminal device shown in FIG. 6 is merely an example, which is not a limitation to the function and scope for using of the embodiments of the present application.

As shown in FIG. 5, the computer system 500 includes a central processing unit (CPU) 501, which may execute various appropriate actions and processes in accordance with a program stored in a read-only memory (ROM) 502 or a program loaded into a random access memory (RAM) 503 from a storage portion 508. The RAM 503 also stores various programs and data required by operations of the system 500. The CPU 501, the ROM 502 and the RAM 503 are connected to each other through a bus 504. An input/output (I/O) interface 505 is also connected to the bus 504.

The following components are connected to the I/O interface 505: an input portion 506 including a keyboard, a mouse etc.; an output portion 507 comprising a cathode ray tube (CRT), a liquid crystal display device (LCD), a speaker etc.; a storage portion 508 including a hard disk and the like; and a communication portion 509 comprising a network interface card, such as a LAN card and a modem. The communication portion 509 performs communication processes via a network, such as the Internet. A driver 510 is also connected to the I/O interface 505 as required. A removable medium 511, such as a magnetic disk, an optical disk, a magneto-optical disk, and a semiconductor memory, may be installed on the driver 510, to facilitate the retrieval of a computer program from the removable medium 511, and the installation thereof on the storage portion 508 as needed.

In particular, according to embodiments of the present disclosure, the process described above with reference to the flow chart may be implemented in a computer software program. For example, an embodiment of the present disclosure includes a computer program product, which includes a computer program that is tangibly embedded in a machine-readable medium. The computer program comprises program codes for executing the method as illustrated in the flow chart. In such an embodiment, the computer program may be downloaded and installed from a network via the communication portion 509, and/or may be installed from the removable media 511. The computer program, when executed by the central processing unit (CPU) 501, implements the above mentioned functionalities as defined by the methods of the present disclosure. It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In the present disclosure, the computer readable storage medium may be any physical medium containing or storing programs which can be used by a command execution system, apparatus or element or incorporated thereto. In the present disclosure, the computer readable signal medium may include data signal in the base band or propagating as parts of a carrier, in which computer readable program codes are carried. The propagating signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

A computer program code for executing operations in the disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including local area network (LAN) or wide area network (WAN), or may be connected to an external computer (for example, connected through Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units or modules involved in the embodiments of the present disclosure may be implemented by means of software or hardware. The described units or modules may also be provided in a processor, for example, described as: a processor, comprising a parsing unit, an obtaining unit, a processing unit and a first playing unit, where the names of these units or modules do not in some cases constitute a limitation to such units or modules themselves. For example, the parsing unit may also be described as "a unit for parsing a received voice query request sent by a user to obtain text query information corresponding to the voice query request."

In another aspect, the present disclosure further provides a computer-readable storage medium. The computer-readable storage medium may be the computer storage medium included in the apparatus in the above described embodiments, or a stand-alone computer-readable storage medium not assembled into the apparatus. The computer-readable storage medium stores one or more programs. The one or more programs, when executed by a device, cause the device to: parse a received voice query request sent by a user to obtain text query information corresponding to the voice query request; obtain text push information obtained by searching using the text query information; process the text push information to obtain to-be-pushed information corresponding to the text push information; and play the to-be-pushed information.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A method for processing information, the method comprising:
   parsing a received voice query request to obtain text query information corresponding to the voice query request;
   obtaining text push information obtained by searching, by a search engine, a website using the text query information, wherein the text push information includes a plurality of paragraphs; and processing the text push information to obtain to-be-pushed information corresponding to the text push information, for a voice player to play the to-be-pushed information, comprising:
   determining that a word number of the text push information exceeds a preset word number threshold;
   after determining that the word number of the text push information exceeds the preset word number threshold, extracting information, the information being associated with the text query information and having a word number not exceeding the preset word number threshold, from the text push information as first information, comprising:
      for each paragraph in the text push information, determining a correlation degree between a content of the paragraph and the text query information;
      sorting the paragraphs according to an order of correlation degrees of the paragraphs; and
      selecting a number of paragraphs from a side of the order with a larger correlation degree, with a sum of word numbers of the selected paragraphs being smaller than the preset word number threshold.

2. The method according to claim 1, wherein the generating the to-be-pushed information on the basis of the first information comprises:
   obtaining a website name of the website to which the text push information belongs; and
   combining the website name with the first information to generate the to-be-pushed information.

3. The method according to claim 1, wherein the generating the to-be-pushed information on the basis of the first information comprises:
   obtaining a website name of a website to which the text push information belongs; and
   combining the text query information, the website name and the first information to generate the to-be-pushed information.

4. The method according to claim 1, wherein the generating the to-be-pushed information on the basis of the first information comprises:
   obtaining a website name of a website to which the text push information belongs and subject information of the text push information; and
   combining the subject information, the website name and the first information to generate the to-be-pushed information.

5. The method according to claim 1, wherein the method further comprises displaying the to-be-pushed information, and the generating the to-be-pushed information on the basis of the first information comprises:
   obtaining picture push information obtained by searching using the text query information; and
   combining the picture push information with the first information to generate the to-be-pushed information.

6. The method according to claim 1, the method further comprising:
   receiving a detailed information acquisition request; and
   playing the text push information.

7. The method according to claim 1, wherein during the to-be-pushed information being played, the method further comprises:
   receiving a voice instruction for controlling a voice playing speed; and
   obtaining a voice playing speed corresponding to the voice instruction, for the voice player to play the to-be-pushed information at the voice playing speed.

8. The method according to claim 1, wherein the determining a correlation degree between a content of the paragraph and the text query information comprises:
   determining the correlation degree according to a number of keywords in the text query information contained in the content of the paragraph.

9. An apparatus for processing information, the apparatus comprising:
   at least one processor; and
   a memory storing instructions, which when executed by the at least one processor, cause the at least one processor to perform operations, the operations comprising:
   parsing a received voice query request to obtain text query information corresponding to the voice query request;
   obtaining text push information obtained by searching, through a search engine, a website using the text query information, wherein the text push information includes a plurality of paragraphs; and
   processing the text push information to obtain to-be-pushed information corresponding to the text push information, for a voice player to play the to-be-pushed information, comprising:
      determining whether a word number of the text push information exceeds a preset word number threshold;
      when the word number of the text push information exceeds the preset word number threshold, extracting information, the information being associated with the text query information and having a word number not exceeding the preset word number threshold, from the text push information as first information, comprising:
         for each paragraph in the text push information, determining a correlation degree between a content of the paragraph and the text query information;
         sorting the paragraphs according to an order of correlation degrees of the paragraphs; and
         selecting a number of paragraphs from a side of the order with a larger correlation degree, with a sum of word numbers of the selected paragraphs being smaller than the preset word number threshold;
      when the word number of the text push information does not exceed the preset word number threshold, assigning the text push information as the first information; and
      generating the to-be-pushed information on the basis of the first information.

10. The apparatus according to claim 9, the operations further comprising:
   receiving a detailed information acquisition request; and
   playing the text push information.

11. A non-transitory computer storage medium, on which computer programs are stored, wherein when the computer programs are executed by processors, cause the processors to perform operations, the operations comprising:
   parsing a received voice query request to obtain text query information corresponding to the voice query request;
   obtaining text push information obtained by searching, by a search engine, a website using the text query information, wherein the text push information includes a plurality of paragraphs; and processing the text push information to obtain to-be-pushed information corresponding to the text push information, for a voice player to play the to-be-pushed information, comprising:
- determining whether a word number of the text push information exceeds a preset word number threshold;
- when the word number of the text push information exceeds the preset word number threshold, extracting information, the information being associated with the text query information and having a word number not exceeding the preset word number threshold, from the text push information as first information, comprising:
  - for each paragraph in the text push information, determining a correlation degree between a content of the paragraph and the text query information;
  - sorting the paragraphs according to an order of correlation degrees of the paragraphs; and
  - selecting a number of paragraphs from a side of the order with a larger correlation degree, with a sum of word numbers of the selected paragraphs being smaller than the preset word number threshold;
- when the word number of the text push information does not exceed the preset word number threshold, assigning the text push information as the first information; and
- generating the to-be-pushed information on the basis of the first information.

* * * * *